US010953739B2

(12) United States Patent
Mcadam et al.

(10) Patent No.: US 10,953,739 B2
(45) Date of Patent: Mar. 23, 2021

(54) WORK VEHICLE

(71) Applicant: MULTIHOG R&D LIMITED, Dundalk (IE)

(72) Inventors: James Mcadam, Carlingford (IE); Gerard Mchugh, Carrickmacross (IE); Anthony Duff, Dundalk (IE); Dallan Mchugh, Dundalk (IE); Daniel Mcelchar, Castlefin (IE); Samuel Hampshire, Drogheda (IE)

(73) Assignee: MULTIHOG R&D LIMITED, Dundalk (IE)

( * ) Notice: Subject to any disclaimer, the term of this patent is extended or adjusted under 35 U.S.C. 154(b) by 184 days.

(21) Appl. No.: 15/772,969

(22) PCT Filed: Nov. 3, 2016

(86) PCT No.: PCT/IE2016/000021
§ 371 (c)(1),
(2) Date: May 2, 2018

(87) PCT Pub. No.: WO2017/077524
PCT Pub. Date: May 11, 2017

(65) Prior Publication Data
US 2018/0319268 A1 Nov. 8, 2018

(30) Foreign Application Priority Data

Nov. 3, 2015 (IE) .................................. S2015/0393

(51) Int. Cl.
*B60K 7/00* (2006.01)
*B60K 17/02* (2006.01)
(Continued)

(52) U.S. Cl.
CPC ............ *B60K 7/0015* (2013.01); *B60K 17/02* (2013.01); *B60K 17/10* (2013.01); *B60K 17/14* (2013.01);
(Continued)

(58) Field of Classification Search
CPC .............................. B60K 17/28; B62D 12/00
(Continued)

(56) References Cited

U.S. PATENT DOCUMENTS 3,398,587 A * 8/1968 Martin .................... A01D 34/03
74/15.63
4,073,364 A 2/1978 Schmidt
(Continued)

FOREIGN PATENT DOCUMENTS

EP 0 982 171 A2 3/2000
GB 2 134 863 A 8/1984

OTHER PUBLICATIONS

International Search Report for PCT/IE2016/000021 dated Mar. 20, 2017.

*Primary Examiner* — Tony H Winner
(74) *Attorney, Agent, or Firm* — Sughrue Mion, PLLC

(57) ABSTRACT

A work vehicle (1) comprising a forward part (3) and a rearward part (7) pivotally coupled about a main vertical pivot axis (10) for steering thereof. A power take-off shaft (29) is located adjacent a forward end (31) of the forward part (3) and is mechanically driven from a main output drive shaft (15) of an engine (14) located in the rearward part (7). A step-up gearbox (20) steps up the speed from the main output drive shaft (15) onto first and second output shafts (23, 24) for driving first and second hydraulic pumps (27, 28) which provide hydraulic supplies for motive power and for operating attachments attached to the forward end (31) of the forward part (3). A step-down gearbox (30) receives
(Continued)

Figure 1:
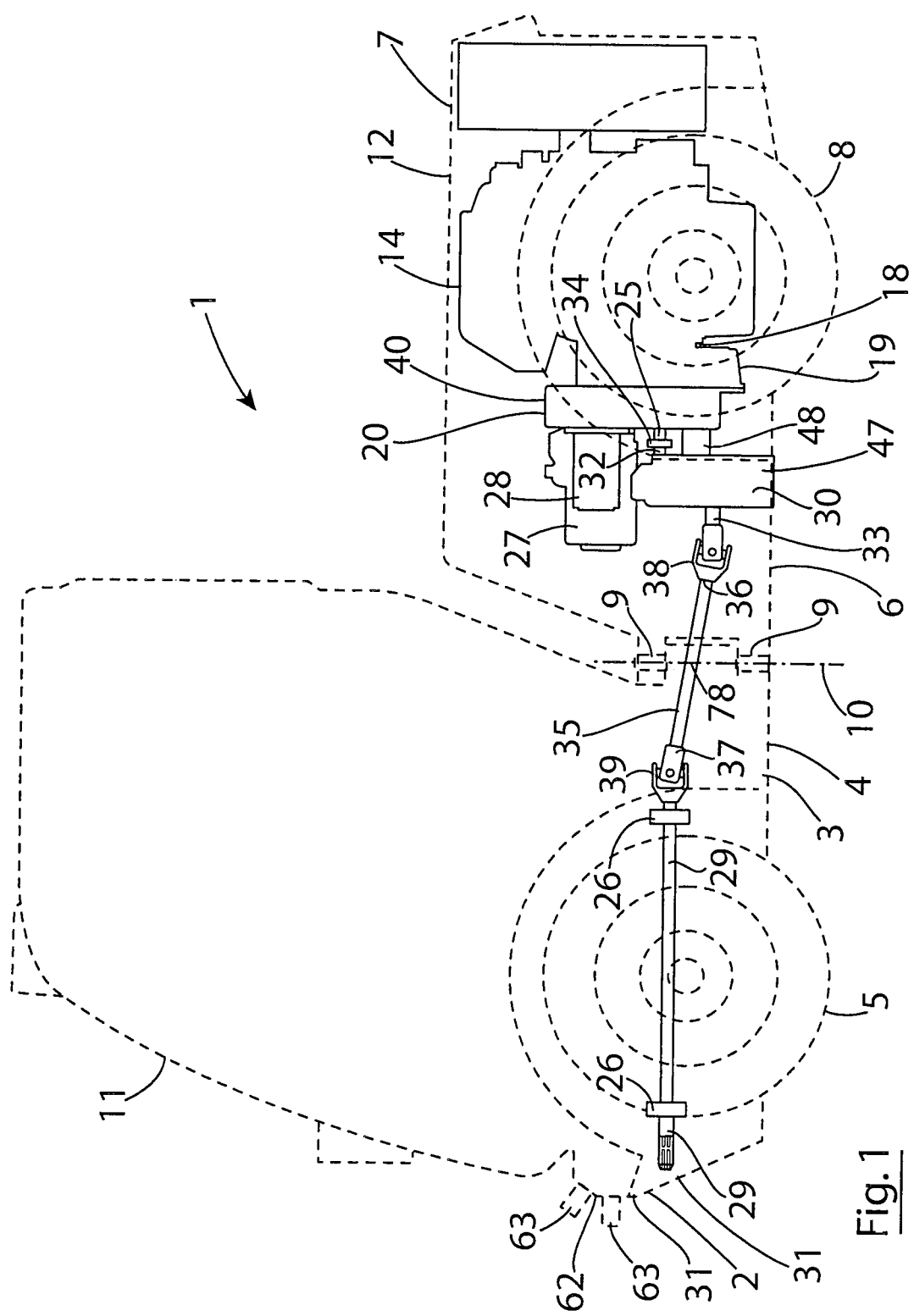

drive directly from the main output drive shaft (15) of the engine (14) and produces a stepped-down drive on an output shaft (33) of the step-down gearbox (30) with a gear ratio of 2:1. A main drive transmission shaft (35) transmits drive from the step-down gearbox (30) to the power take-off shaft (29) at the regulatory speed of a power take-off shaft in the range of 540 rpm to 1000 rpm, thereby minimising the speed of the mechanical drive required from the rearward part (7) to the forward part (3), and reducing the mechanical drives required from the rearward part (7) to the forward part (3) to a single mechanical drive.

22 Claims, 8 Drawing Sheets

(51) Int. Cl.
*B60K 17/28* (2006.01)
*B60K 25/06* (2006.01)
*B60K 17/356* (2006.01)
*B62D 12/00* (2006.01)
*B60K 17/10* (2006.01)
*B60K 17/14* (2006.01)
*E02F 9/22* (2006.01)
*E02F 9/08* (2006.01)
*B62D 53/02* (2006.01)
*B62D 21/18* (2006.01)
*F16H 39/02* (2006.01)

(52) U.S. Cl.
CPC ............ *B60K 17/28* (2013.01); *B60K 17/356* (2013.01); *B60K 25/06* (2013.01); *B62D 12/00* (2013.01); *B62D 21/186* (2013.01); *B62D 53/026* (2013.01); *E02F 9/0841* (2013.01); *E02F 9/2253* (2013.01); *F16H 39/02* (2013.01); *B60K 2007/0038* (2013.01); *B60K 2007/0092* (2013.01); *B60Y 2200/417* (2013.01)

(58) Field of Classification Search
USPC ....................................... 180/53.7, 14.4, 235
See application file for complete search history.

(56) References Cited

U.S. PATENT DOCUMENTS

| | | | | |
|---|---|---|---|---|
| 4,139,073 A * | 2/1979 | Curtis | ................. | B60K 17/22 180/14.4 |
| 4,424,878 A * | 1/1984 | van der Lely | ......... | B62D 61/10 180/235 |
| 4,662,472 A | 5/1987 | Christianson et al. | | |
| 4,936,302 A * | 6/1990 | Abernathy | ............. | A61B 17/12 433/73 |
| 5,137,106 A * | 8/1992 | Allen | ................. | B62D 53/025 180/235 |
| 6,237,708 B1 * | 5/2001 | Kawada | ................. | B60K 17/28 180/53.7 |
| 6,464,643 B1 * | 10/2002 | Brock-Fisher | ......... | A61B 8/481 600/458 |
| 7,694,772 B1 * | 4/2010 | Doll | ..................... | B60T 13/686 180/235 |
| 9,464,407 B2 * | 10/2016 | Stutchbury | ............ | B60K 17/04 |
| 2002/0170765 A1 | 11/2002 | Bauer et al. | | |
| 2012/0317846 A1 * | 12/2012 | Audet | ................ | B62D 55/0655 37/266 |

* cited by examiner

WORK VEHICLE

CROSS REFERENCE TO RELATED APPLICATIONS

This application is a National Stage of International Application No. PCT/IE2016/000021 filed Nov. 3, 2016, claiming priority based on Irish Patent Application No. S2015/0393 filed Nov. 3, 2015.

The present invention relates to a work vehicle and to a method for driving a power take-off shaft of a work vehicle.

Work vehicles are known, and in general, are configured to receive and power a plurality of attachments and tools, for example, a snow plough blade, one or more elongated transversely extending rotatably mounted brushes for brushing snow, leaves and other debris from roads, footpaths, airport runways, airport aprons and the like, vacuum suction elements for vacuum cleaning roads, footpaths, airport runways and airport aprons, as well as a myriad of other tools, for example, snow blowers, mowing attachments, spraying attachments, high pressure water jet cleaning attachments and the like.

In general, such work vehicles comprise a forward part supported on a pair of forward ground engaging wheels, and a rearward part supported on a pair of rearward ground engaging wheels. The forward and rearward parts are pivotally connected about a substantially vertically extending pivot axis so that the forward and rearward parts are pivotal relative to each other about the vertically extending pivot axis for steering of the work vehicle. Hydraulic rams located on respective opposite sides of the work vehicle and acting between the forward and rearward parts thereof pivot the forward and rearward parts of the work vehicle relative to each other for steering the work vehicle.

In general, an internal combustion engine, which typically is diesel powered is located in the rearward part of the work vehicle, and provides the necessary motive power for the work vehicle, and also provides power for operating the various tools and attachments coupled to the work vehicle. Motive power for such work vehicles, in general, is provided by a hydrostatic drive system powered by the engine. The hydrostatic drive system comprises hydraulic motors which are coupled to the respective ground engaging wheels for driving thereof. An hydraulic power supply is provided for the hydrostatic drive system. Power for the tools and attachments, in general, is also provided by an hydraulic power supply, which, in general, although not necessarily is provided by a separate hydraulic power supply to that of the motive hydraulic power supply. Many such work vehicles also include a power take-off shaft which is located to the front of the forward part of the work vehicle, and is rotatably mounted in the forward part thereof. The power take-off shaft provides mechanical drive for attachments which are coupled to the work vehicle, for example, a mower or the like.

In many such work vehicles the hydraulic power supply for the hydraulic motive power of the work vehicle, and also the hydraulic power supply to power attachments to the work vehicle is provided by one or more hydraulic pumps which are located in the forward part of the work vehicle. Mechanical drive from the engine, which is located in the rearward part of the work vehicle, must be transmitted to the forward part thereof through a mechanical drive transmission shaft. The mechanical drive shaft couples the main output drive shaft of the engine to the one or more hydraulic pumps which are located in the forward part of the work vehicle. The mechanical drive shaft rotates at the speed at which the main output drive shaft of the engine rotates, which during normal operating speeds of the engine, depending on the engine, would generally lie in the range of 2000 rpm to 3000 rpm. The drive shaft must therefore extend from the rearward part of the work vehicle to the forward part thereof across the vertically extending main pivot axis, about which the forward and rearward parts are pivotal for steering of the work vehicle.

In general, because of the relatively confined space in such work vehicles, it is not possible to shield the drive shaft. During steering of such work vehicles, it is necessary to pivot the forward and rearward parts of the work vehicle relative to each other about the main vertical pivot axis. During such relative pivoting of the forward and rearward parts of the work vehicle, the drive shaft may become dangerously exposed, and clothing of a person standing near the work vehicle could readily easily become caught on the drive shaft, with consequent serious, and in some cases fatal outcomes, due to the relatively high rotational speed of the drive shaft. Accordingly, such work vehicles may constitute a safety hazard. This is undesirable.

Additionally, in cases where such work vehicles include a power take-off shaft in the forward part of the work vehicle, it is normal to transmit drive from the engine in the rearward part of the work vehicle, at the engine speed, to a step-down gearbox, which is located in the forward part of the work vehicle through which the power take-off shaft is driven, in order to provide drive at the required rotational speed for the power take-off shaft. Typical rotational speeds for power take-off shafts of such work vehicles are 540 rpm, 750 rpm and 1000 rpm when the engine is running at its normal operational speed, which typically would be in the order of 2000 rpm to 3000 rpm. The drive from the engine to the step-down gearbox may be transmitted through the same mechanical drive transmission shaft which transmits drive to the hydraulic pump or pumps, or through a separate mechanical drive transmission shaft. However, irrespective of whether one single mechanical drive transmission shaft or two mechanical drive transmission shafts are provided to transmit drive from the rearward part to the forward part of the work vehicle, the mechanical drive transmission shaft or shafts are driven at the rotational speed of the main output drive shaft of the engine, namely, at a rotational speed in the order of 2000 rpm to 3000 rpm. This again can result in serious if not fatal accidents.

There is therefore a need for a work vehicle which addresses at least some of the problems of such work vehicles.

The present invention is directed towards providing such a work vehicle.

According to the invention there is provided a work vehicle comprising a forward part supported on a pair of forward ground engaging wheels, and a rearward part supported on a pair of rearward ground engaging wheels, at least one of the pairs of forward ground engaging wheels and rearward ground engaging wheels being rotatably driven by at least one hydraulic drive motor, the rearward part of the work vehicle being pivotally coupled to the forward part thereof about a substantially vertically extending main pivot axis for facilitating steering of the work vehicle, an engine located in the rearward part of the work vehicle, the engine comprising a main output drive shaft, a first hydraulic pump located in the rearward part of the work vehicle powered by drive derived from the main output drive shaft of the engine, the first hydraulic pump being configured to produce an hydraulic power supply for powering the at least one hydraulic drive motor, a power take-off shaft rotatably mounted in the forward part of the work vehicle, a mechanical step-down drive transmission means located in the rearward part of the work vehicle, the mechanical step-down drive transmission means having an input shaft driven by drive derived from the main output drive shaft of the engine and an output shaft for producing drive for transmission to the power take-off shaft, the mechanical step-down drive transmission means having a step-down gear ratio to produce drive on the output shaft thereof of rotational speed less than the rotational speed of the main output drive shaft of the engine, and a main mechanical drive transmission means transmitting drive from the output shaft of the mechanical step-down drive transmission means to the power take-off shaft located in the forward part of the work vehicle.

In one aspect of the invention the step-down gear ratio of the mechanical step-down drive transmission means is configured to produce drive on the output shaft thereof of rotational speed not exceeding a regulatory rotational speed for a power take-off shaft when the engine is running at its normal operating speed. Preferably, the step-down gear ratio of the mechanical step-down drive transmission means is configured to produce drive on the output shaft thereof of rotational speed in the range of 500 rpm to 1500 rpm when the engine is running at its normal operating speed. Advantageously, the step-down gear ratio of the mechanical step-down drive transmission means is configured to produce drive on the output shaft thereof of rotational speed in the range of 540 rpm to 1100 rpm when the engine is running at its normal operating speed. Ideally, the step-down gear ratio of the mechanical step-down drive transmission means is configured to produce drive on the output shaft thereof of rotational speed of one of 540 rpm, 750 rpm and 1000 rpm when the engine is running at its normal operating speed.

In another aspect of the invention an isolating means is provided for selectively isolating drive on the main output drive shaft of the engine from the output shaft of the mechanical step-down drive transmission means. Preferably, the isolating means comprises a clutch. Advantageously, the clutch is located at one of a location between the main output drive shaft of the engine and the mechanical step-down drive transmission means, a location between the mechanical step-down drive transmission means and the main mechanical drive transmission means, and a location in the mechanical step-down drive transmission means.

In one aspect of the invention the clutch comprises an integrated clutch integrated into the mechanical step-down drive transmission means. Preferably, the clutch is located on the output side of the step-down drive transmission means between the main output drive shaft and the mechanical step-down drive transmission means.

In another aspect of the invention the input shaft of the mechanical step-down drive transmission means is driven directly from the main output drive shaft of the engine. Preferably, the input shaft of the mechanical step-down drive transmission means is coupled to the main output shaft of the engine. Advantageously, the input shaft of the mechanical step-down drive transmission means is coupled to the main output drive shaft of the engine through a flexible drive coupling.

In one aspect of the invention the mechanical step-down drive transmission means comprises at least two meshing step-down gears to produce the step-down gear ratio between the input shaft of the mechanical step-down drive transmission means and the output shaft thereof. Preferably, the meshing step-down gears of the mechanical step-down drive transmission means are housed in a housing. Advantageously, the input shaft and the output shaft of the mechanical step-down drive transmission means extend through the housing.

Preferably, the mechanical step-down drive transmission means is configured in the form of a step-down gearbox.

In another aspect of the invention the main mechanical drive transmission means comprises a main drive transmission shaft extending between a first end and a second end, the first end thereof terminating in a first universal coupling coupled to the output shaft of the mechanical step-down drive transmission means, the second end of the main drive transmission shaft terminating in a second universal coupling, through which drive is transmitted to the power take-off shaft. Preferably, the main drive transmission shaft is coupled to the power take-off shaft by the second universal coupling.

In one aspect of the invention the length of the main drive transmission shaft from the centre of the first universal coupling to the centre of the second universal coupling does not exceed 500 mm when the forward part and the rearward part are aligned in the forward/rearward direction. Preferably, the length of the main drive transmission shaft from the centre of the first universal coupling to the centre of the second universal coupling does not exceed 400 mm when the forward part and the rearward part are aligned in the forward/rearward direction. Advantageously, the length of the main drive transmission shaft from the centre of the first universal coupling to the centre of the second universal coupling is approximately 350 mm when the forward part and the rearward part are aligned in the forward/rearward direction.

In another aspect of the invention the main mechanical drive transmission means further comprises an intermediate drive transmission shaft configured to transmit drive from the main drive transmission shaft to the power take-off shaft. Preferably, the main drive transmission shaft is coupled to the intermediate drive transmission shaft by the second universal coupling. Advantageously, the intermediate drive transmission shaft is rotatably carried in at least one intermediate shaft carrying bearing anchored in the forward part of the work vehicle.

In another aspect of the invention a pair of intermediate shaft carrying bearings are provided spaced apart along the intermediate drive transmission shaft and located towards the respective opposite ends of the intermediate drive transmission shaft.

In one aspect of the invention the intermediate drive transmission shaft terminates adjacent the power take-off shaft in a third universal coupling through which the power take-off shaft is driven by the intermediate drive transmission shaft.

In another aspect of the invention the substantially vertically extending main pivot axis passes through the main drive transmission shaft when the forward and rearward parts of the work vehicle are aligned in a forward/rearward direction. Preferably, the substantially vertically extending main pivot axis passes through a point of the main drive transmission shaft substantially midway between the respective first and second ends of the main drive transmission shaft when the forward and rearward parts of the work vehicle are substantially aligned in the forward/rearward direction.

In one aspect of the invention the main mechanical drive transmission means is located in a safety protective shield. Preferably, the safety protective shield comprises an elongated sleeve. Advantageously, the safety protective shield comprises a pair of sleeves configured to telescope one into and out of the other.

Preferably, the power take-off shaft is rotatably carried in at least one main bearing anchored in the forward part of the work vehicle. Advantageously, the power take-off shaft is rotatably carried in a pair of the main bearings spaced apart from each other and located towards the respective opposite ends of the power take-off shaft.

In another aspect of the invention a mechanical step-up drive transmission means is located in the rearward part of the work vehicle, the mechanical step-up drive transmission means comprising an input shaft driven by drive derived from the main output drive shaft of the engine, and at least a first output drive, the first output drive being configured to produce drive for powering the first hydraulic pump. Preferably, the mechanical step-up drive transmission means comprises a second output drive.

In another aspect of the invention a second hydraulic pump is provided for producing a hydraulic power supply for powering one or more hydraulically powered attachments coupled to or associated with the work vehicle, the second hydraulic pump being located in the rearward part of the work vehicle, and being configured to be powered by drive from one of the first and second output drives from the mechanical step-up drive transmission means.

In another aspect of the invention the second hydraulic pump is configured to be driven by the second output drive of the mechanical step-up drive transmission means.

In one aspect of the invention the mechanical step-up drive transmission means is configured to have a first step-up gear ratio between the input shaft and the first output drive, the first step-up gear ratio being configured so that the rotational speed of the drive on the first output drive is greater than the rotational speed of the main output drive shaft of the engine. Preferably, the mechanical step-up drive transmission means is configured to have a second step-up gear ratio between the input shaft and the second output drive, the second step-up gear ratio being configured so that the rotational speed of drive on the second output drive is greater than the rotational speed of the main output drive shaft of the engine.

The second step-up gear ratio may be the same or different to the first step-up gear ratio.

In one aspect of the invention the input shaft of the mechanical step-up drive transmission means is driven directly from the main output drive shaft of the engine. Preferably, the input shaft of the mechanical step-up drive transmission means is coupled to the main output drive shaft of the engine through a flexible drive coupling.

In another aspect of the invention the first and second output drives of the mechanical step-up drive transmission means comprise first and second output shafts, respectively.

In one aspect of the invention the mechanical step-up drive transmission means comprises at least two first step-up meshing gears to produce the first step-up gear ratio between the input shaft of the mechanical step-up drive transmission means and the first output shaft thereof. Preferably, the mechanical step-up drive transmission means comprises at least two second step-up meshing gears to produce the second step-up gear ratio between the input shaft of the mechanical step-up drive transmission means and the second output shaft thereof. Advantageously, one of the gears of each of the first and second step-up meshing gears of the mechanical step-up drive transmission means comprises a common gear.

Preferably, the common gear is mounted on the input shaft of the mechanical step-up drive transmission means. Advantageously, the other gear of each of the first and second step-up meshing gears mesh with the common gear to produce the drive on the respective first and second output shafts. Advantageously, the said other gear of each of the first and second step-up meshing gears is mounted on a corresponding one of the first output shaft and the second output shaft of the mechanical step-up drive transmission means.

In one aspect of the invention the common gear of the first and second meshing step-up gears of the mechanical step-up drive transmission means comprises an externally toothed gearwheel, and each of the other ones of the first and second meshing step-up gears of the mechanical step-up drive transmission means comprises an externally toothed gearwheel. Preferably, the common gear of the mechanical step-up drive transmission means is mounted fast on the input shaft of the mechanical step-up drive transmission means.

Advantageously, the other ones of the first and second meshing step-up gears of the mechanical step-up drive transmission means are mounted on the corresponding one of the first and second output shafts of the mechanical step-up drive transmission means.

In one aspect of the invention the first and second step-up meshing gears of the mechanical step-up drive transmission means are located in a housing.

In another aspect of the invention the input shaft of the mechanical step-up drive transmission means and the first and second output shafts thereof extend through the housing of the mechanical step-up drive transmission means.

In another aspect of the invention the mechanical step-up drive transmission means is configured as a step-up gearbox.

In another aspect of the invention the first hydraulic pump is driven directly from the first output shaft of the mechanical step-up drive transmission means. Preferably, the second hydraulic pump is driven directly from the second output shaft of the mechanical step-up drive transmission means.

Advantageously, the mechanical step-up drive transmission means is located on the output side of the flywheel of the engine, such that the flywheel is located between the engine and the mechanical step-up drive transmission means.

In one aspect of the invention the input shaft of the step-down gearbox is driven directly from the main output drive shaft of the engine through a direct drive through the mechanical step-up drive transmission means.

Preferably, each of the ground engaging wheels of the forward and rearward parts of the work vehicle is powered by a corresponding hydraulic drive motor.

In another aspect of the invention the normal operating speed of the main output drive shaft of the engine lies in the range of 1500 rpm to 4000 rpm. Preferably, the normal operating speed of the main output drive shaft of the engine lies in the range of 1500 rpm to 3000 rpm. Advantageously, the normal operating speed of the main output drive shaft of the engine lies in the range of 2000 rpm to 3000 rpm.

The invention also provides a method for driving a power take-off shaft of a work vehicle wherein the work vehicle comprises a forward part supported on a pair of forward ground engaging wheels, and a rearward part supported on a pair of rearward ground engaging wheels, at least one of the pairs of forward ground engaging wheels and rearward ground engaging wheels being rotatably driven by at least one hydraulic drive motor, the rearward part of the work vehicle being pivotally coupled to the forward part thereof about a substantially vertically extending main pivot axis for facilitating steering of the work vehicle, an engine located in the rearward part of the work vehicle, the engine comprising a main output drive shaft, a first hydraulic pump located in the rearward part of the work vehicle powered by drive derived from the main output drive shaft of the engine, the first hydraulic pump being configured to produce an hydraulic power supply for powering the at least one drive motor, the power take-off shaft being rotatably mounted in the forward part of the work vehicle, the method comprising locating a mechanical step-down drive transmission means in the rearward part of the work vehicle, the mechanical step-down drive transmission means having an input shaft and an output shaft, driving the input shaft of the mechanical step-down drive transmission means by drive derived from the main output drive shaft of the engine, configuring the mechanical step-down drive transmission means to have a step-down gear ratio to produce drive on the output shaft thereof of rotational speed less than the rotational speed of the main output drive shaft of the engine, and transmitting drive from the output shaft of the mechanical step-down drive transmission means to the power take-off shaft located in the forward part of the work vehicle through a main mechanical drive transmission means.

In one aspect of the invention the step-down gear ratio of the mechanical step-down drive transmission means is configured to produce drive on the output shaft thereof of rotational speed not exceeding a regulatory rotational speed for a power take-off shaft when the engine is running at its normal operating speed. Preferably, the step-down gear ratio of the mechanical step-down drive transmission means is configured to produce drive on the output shaft thereof of a rotational speed in the range of 500 rpm to 1500 rpm when the engine is operating at its normal operating speed. Advantageously, the step-down gear ratio of the mechanical step-down drive transmission means is configured to produce drive on the output shaft thereof of a rotational speed in the range of 540 rpm to 1100 rpm when the engine is operating at its normal operating speed. Ideally, the step-down gear ratio of the mechanical step-down drive transmission means is configured to produce drive on the output shaft thereof of a rotational speed of one of 540 rpm, 750 rpm and 1000 rpm when the engine is operating at its normal operating speed.

In one aspect of the invention drive from the main output drive shaft of the engine is selectively isolatable from the main mechanical drive transmission means. Preferably, a clutch is provided for selectively isolating the drive from the main output drive shaft of the engine from the main mechanical drive transmission means. Advantageously, the clutch is located at one of a location between the main output drive shaft of the engine and the mechanical step-down drive transmission means, a location between the mechanical step-down drive transmission means and the main mechanical drive transmission means, and a location in the mechanical step-down drive transmission means. Preferably, the clutch comprises an integrated clutch integrated into the mechanical step-down drive transmission means.

The advantages of the invention are many. A particularly important advantage of the invention is achieved by virtue of the fact that since the motive power to the forward and rearward ground engaging wheels is provided hydraulically, and since the hydraulic power supply for driving the forward and rearward ground engaging wheels is provided by the first hydraulic pump, which is located in the rearward part of the work vehicle, and since the second hydraulic pump for providing an hydraulic power supply to the attachments of the work vehicle is also located in the rearward part of the work vehicle, the only mechanical drive which is required from the rearward part of the work vehicle to the forward part thereof is a mechanical drive transmission to drive the forward power take-off shaft. Thus, only one single mechanical drive transmission is required between the forward and rearward parts of the work vehicle, namely, the mechanical drive transmission means. Since the mechanical step-down drive transmission means for stepping down the drive from main output drive shaft of the engine to produce drive at the appropriate rotational speed for the power take-off shaft of the work vehicle is located in the rearward part of the work vehicle, the rotational speed of the mechanical drive transmission means is at a relatively low speed, namely, at the regulatory allowable rotational speed of the power take-off shaft, which in general, lies in the range of 500 rpm to 1000 rpm, and generally at a rotational speed of either 540 rpm, 750 rpm or 1000 rpm when the engine is operating at its normal operational speed.

Accordingly, the work vehicle according to the invention is a significantly safer work vehicle than those known heretofore, since there is only one single mechanical drive between the rearward part and the forward part of the work vehicle, and that single mechanical drive is rotating at a relatively low speed, namely, the regulatory allowable rotational speed of a power take-off shaft.

Additionally, by virtue of the fact that the rotational speed of the main drive transmission means which is transmitted into the forward part of the work vehicle is at the regulatory speed allowed for a power take-off shaft, vibrations and other noise and discomforting characteristics of a mechanical drive are minimised in the forward part of the work vehicle, and in particular in the driver's cab.

A further advantage of the invention is achieved by virtue of the fact that the only mechanical drive which is required to be transmitted from the rearward part to the forward part of the work vehicle is that for the power take-off shaft, and since drive from a power take-off shaft is not always required, during periods where drive from the power take-off shaft is not required, the isolating means may be operated in order to isolate drive from the mechanical step-down drive transmission means to the main drive transmission means, and thus eliminating any vibration in the forward part of the work vehicle, which otherwise might result from rotation of the main drive transmission means and the power take-off shaft.

A further advantage of the invention is achieved when the first and second hydraulic pumps are located in the rearward part of the work vehicle, since there is no need for the transmission of mechanical drive from the engine in the rearward part of the work vehicle to one or more hydraulic pumps which otherwise would be located in the forward part of the work vehicle. Additionally, by locating the first and second hydraulic pumps in the rearward part of the work vehicle, the speed at which the first and second hydraulic pumps can be driven can be readily stepped up as in the case of the present invention, thereby increasing the motive speed at which the work vehicle can be driven.

Figure 2:
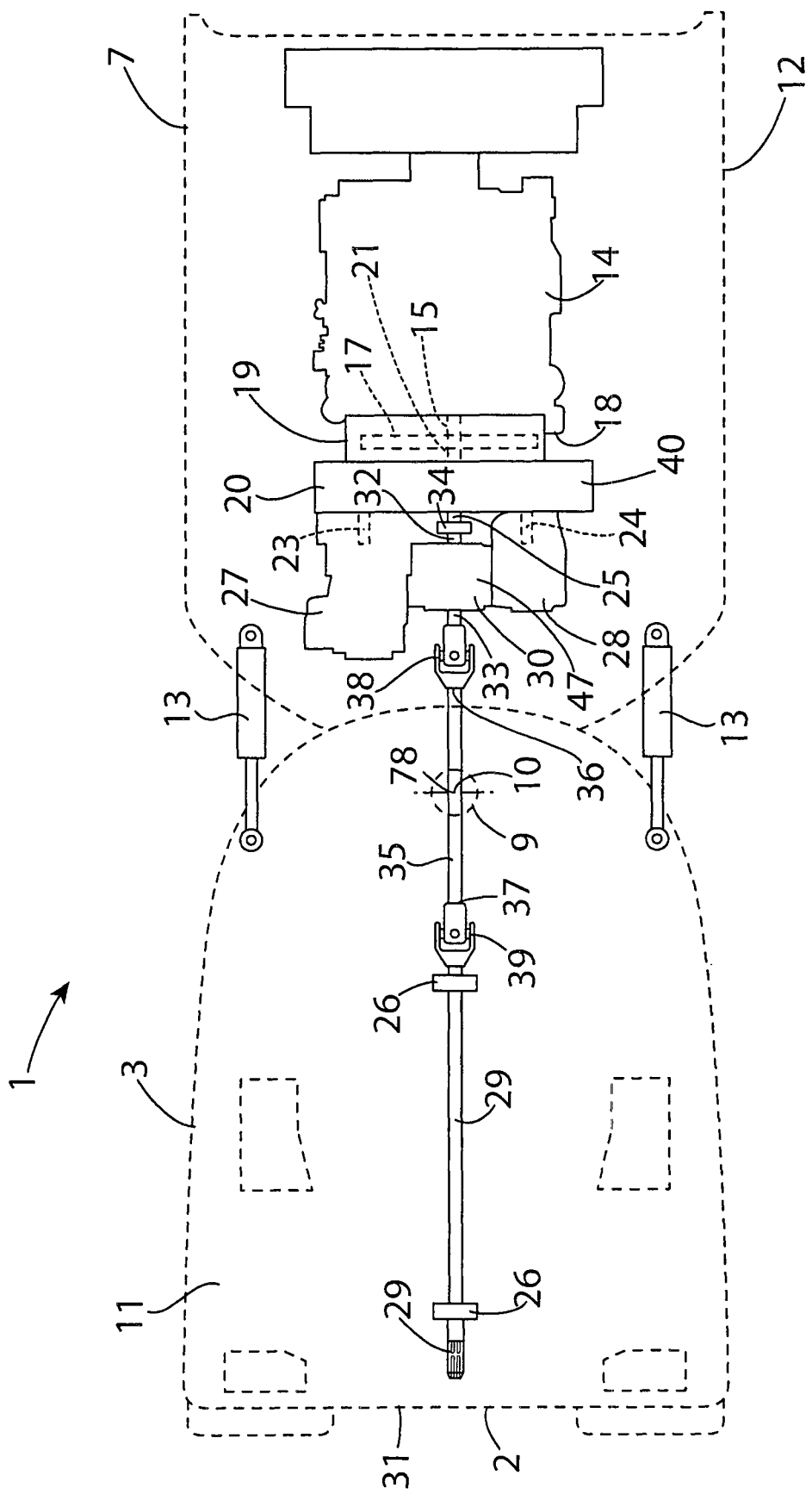
Figure 3:
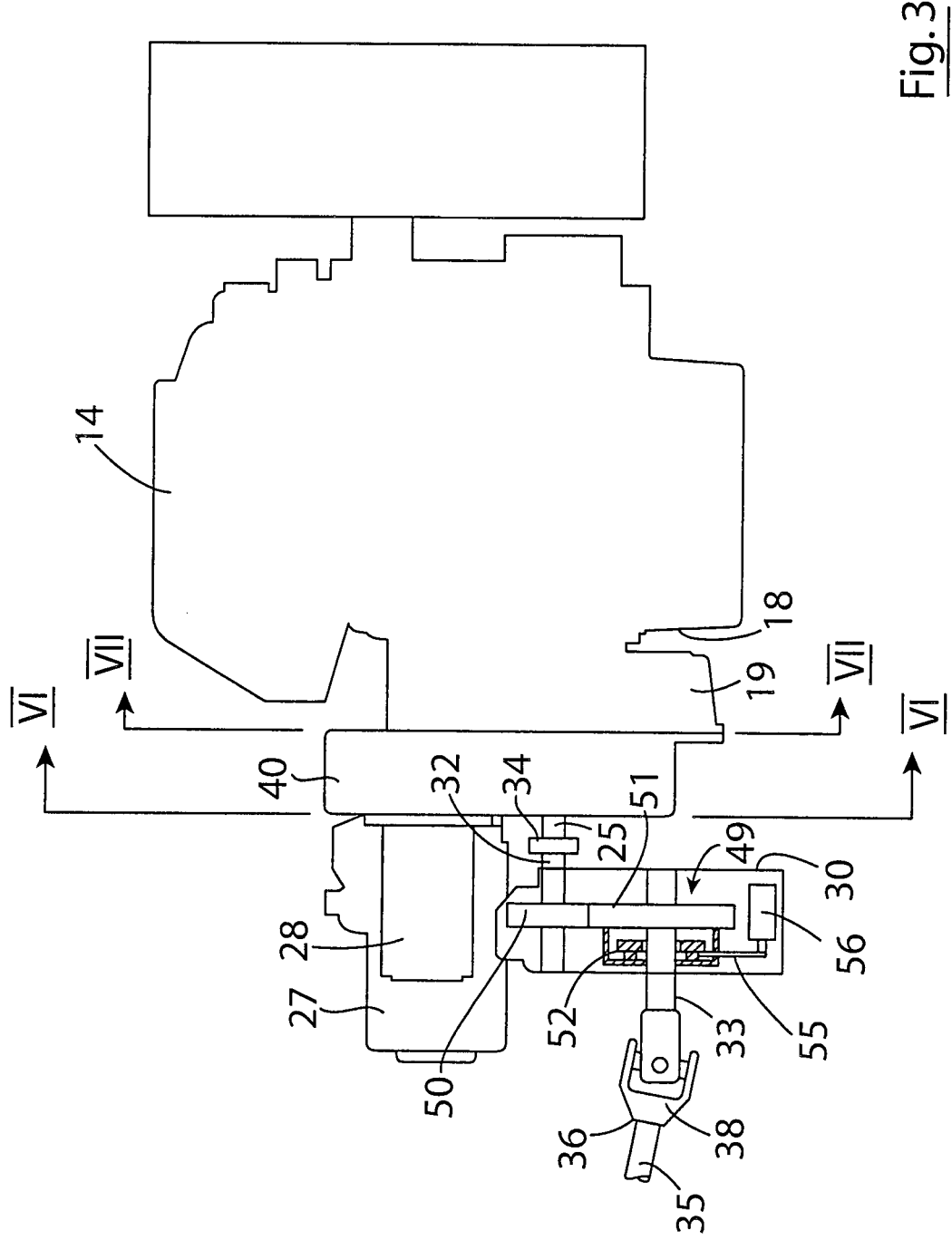
Figure 4:
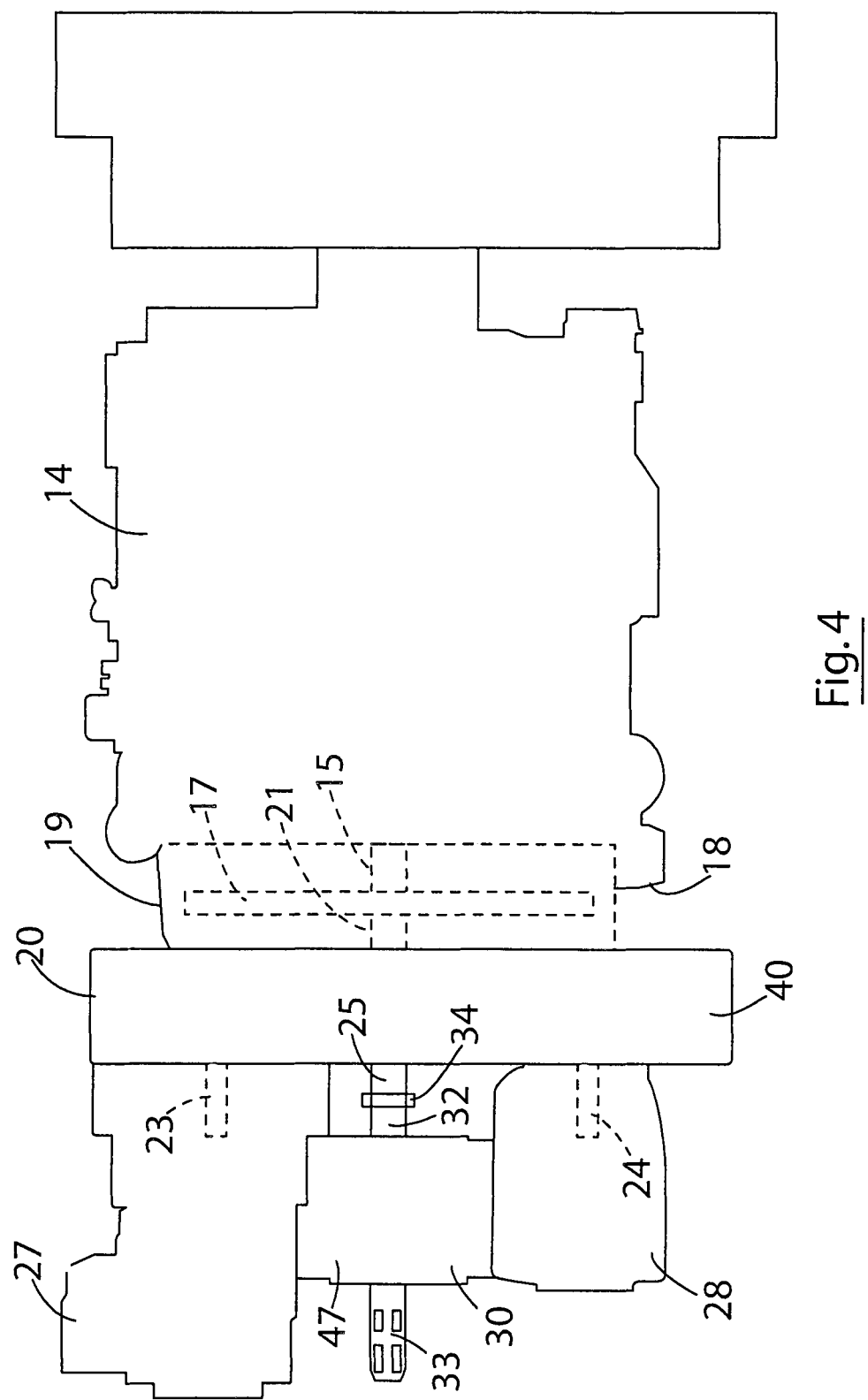
Figure 5:
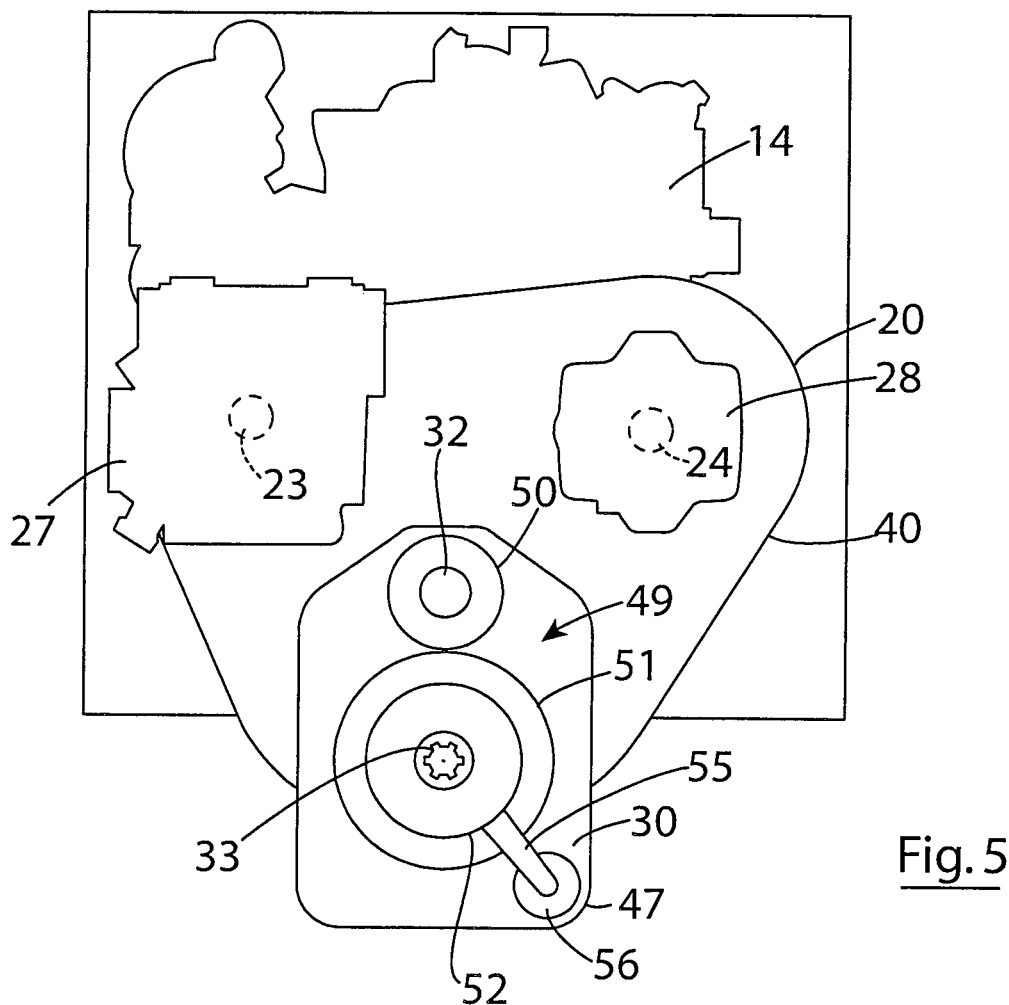
Figure 9:
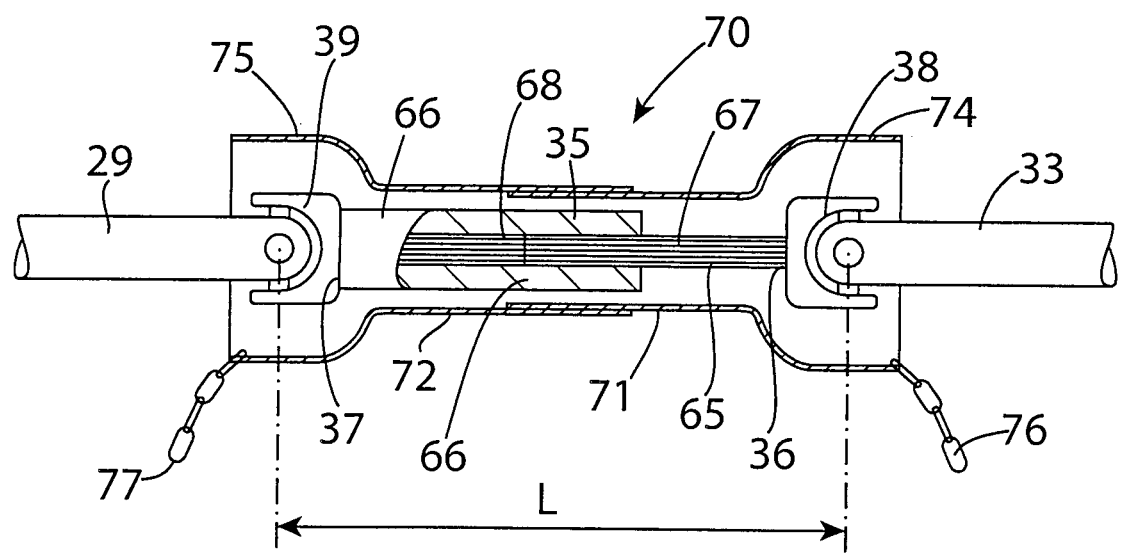
Figure 6:
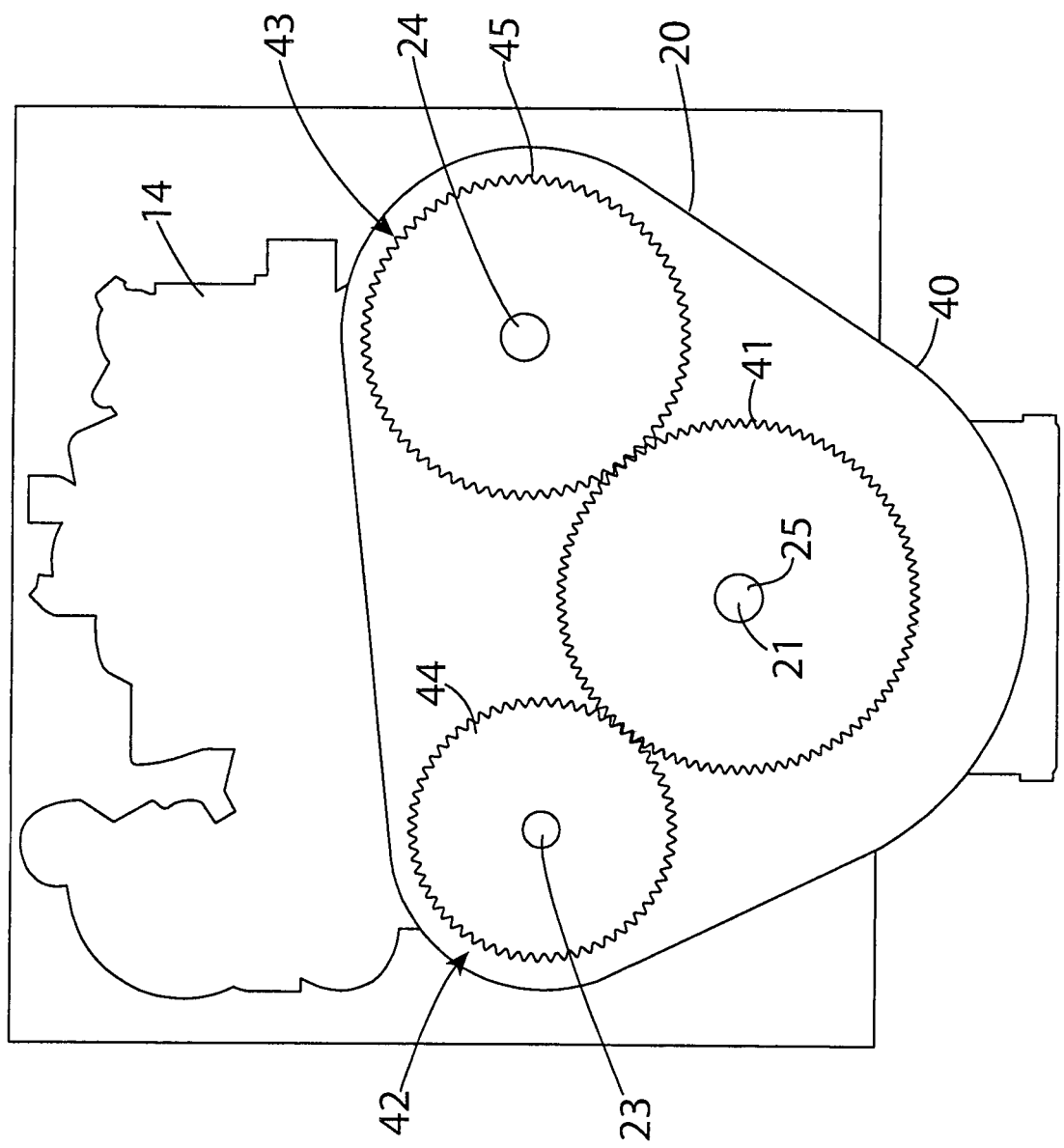
Figure 7:
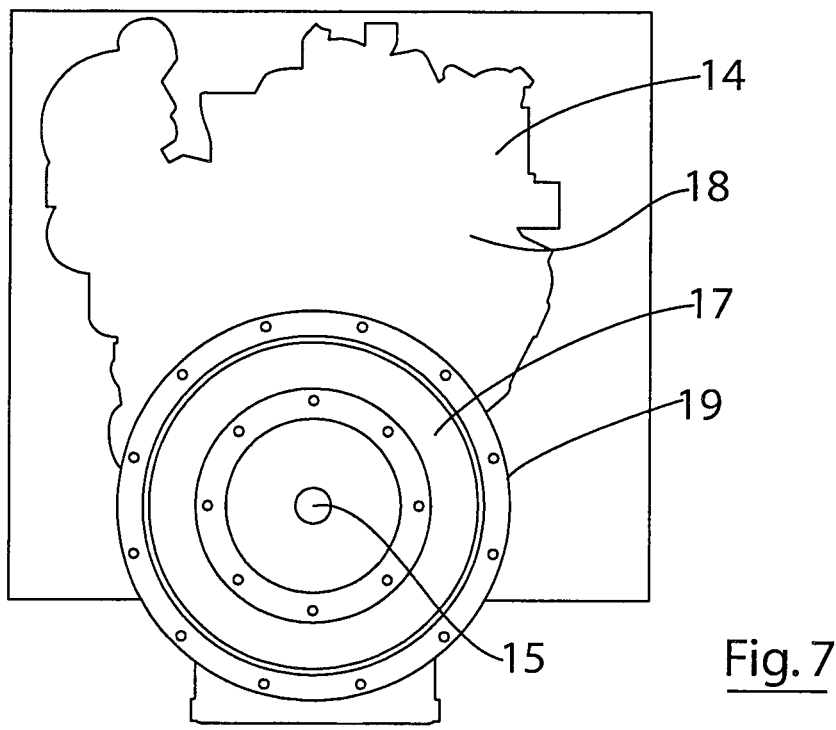
Figure 8:
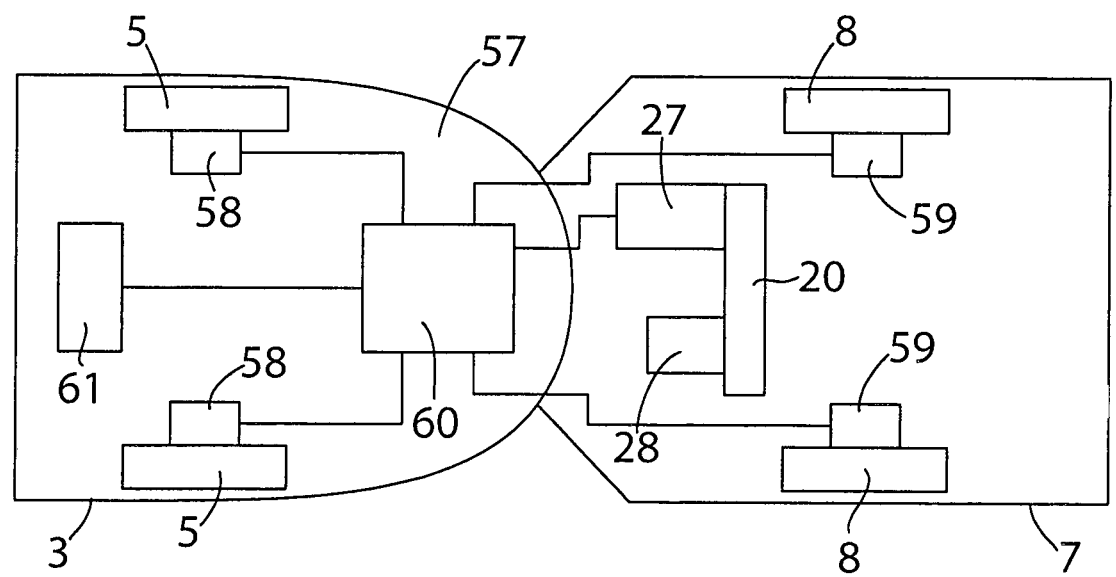
Figure 10:
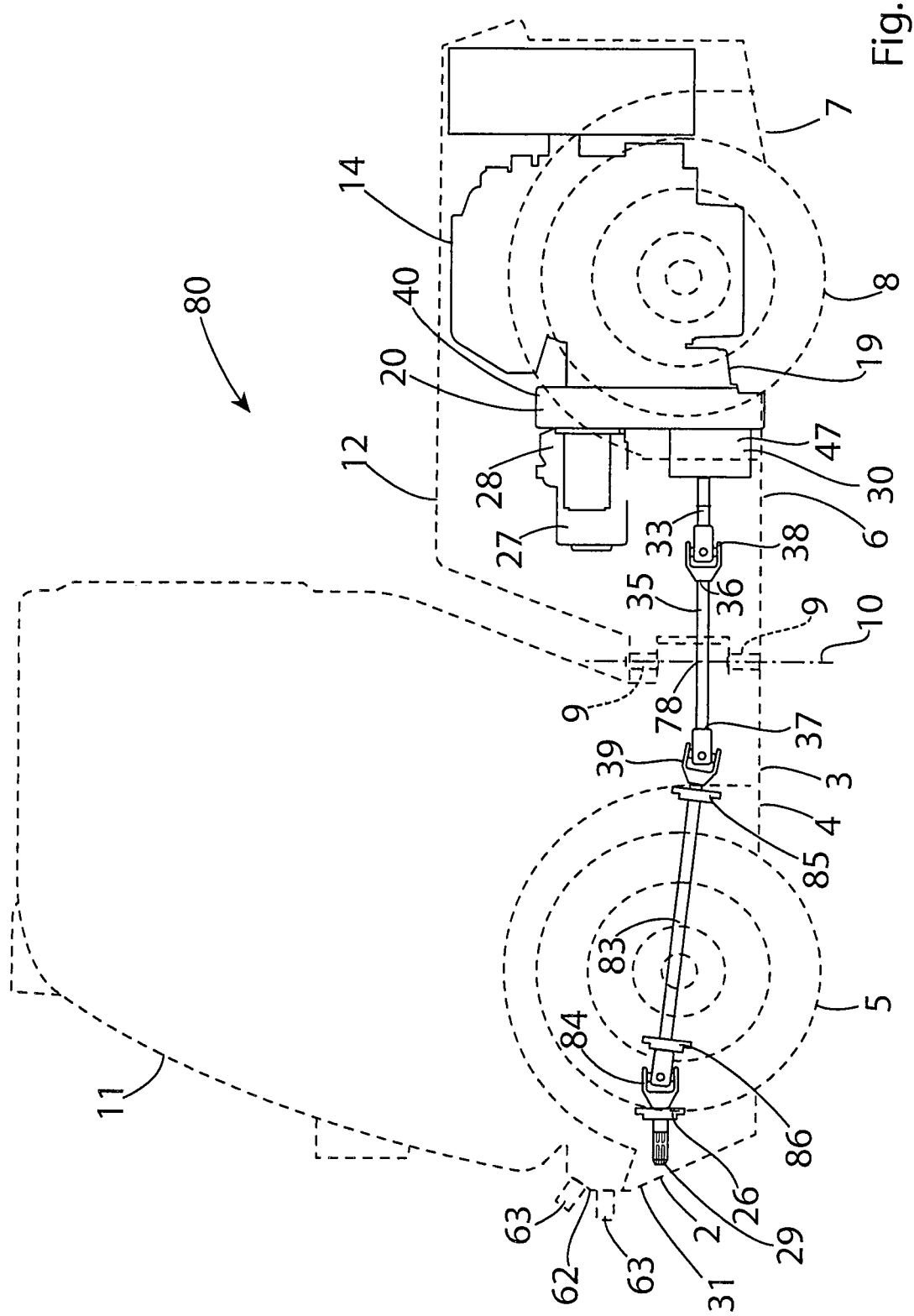

The invention will be more clearly understood from the following description of some preferred embodiments thereof, which are given by way of example only, with reference to the accompanying drawings, in which:

FIG. 1 is a partly diagrammatic side elevational view of a work vehicle according to the invention, FIG. 2 is a partly diagrammatic top plan view of the work vehicle of FIG. 1, FIG. 3 is a side elevational view of a portion of the work vehicle of FIG. 1, FIG. 4 is a top plan view of the portion of FIG. 3 of the work vehicle of FIG. 1, FIG. 5 is a front elevational view of the portion of FIG. 3 of the work vehicle of FIG. 1, FIG. 6 is a cross-sectional front elevational view of the portion of FIG. 3 on the line VI-VI of FIG. 3 of the work vehicle of FIG. 1, FIG. 7 is a cross-sectional front elevational view of the portion of FIG. 3 on the line VII-VII of FIG. 3 of the work vehicle of FIG. 1, FIG. 8 is a block representation of an hydraulic system of the work vehicle of FIG. 1, FIG. 9 is a cross-sectional side elevational view of a detail of the work vehicle of FIG. 1, and FIG. 10 is a view similar to FIG. 1 of a work vehicle according to another embodiment of the invention.

Referring to the drawings, and initially to FIGS. 1 to 9, there is illustrated a wheeled work vehicle according to the invention, indicated generally by the reference numeral 1. The work vehicle 1 is particularly suitable for receiving attachments and tools which are powered by the work vehicle 1. Such attachments, for example, may comprise a snow plough blade, an elongated transversely extending cylindrical brush, both of which would be mounted to the forward end 2 of the work vehicle 1, and other tools and attachments, for example, a snow blower, an asphalt planer, weed control apparatus, a mower for mowing grass, a sprayer for spraying, a pressurised water jet system for cleaning ground and other surfaces, a vacuum suction system for vacuum cleaning roads, footpaths, airport runways, airport aprons and the like, and many other such attachments and tools, which will be well known to those skilled in the art.

The work vehicle 1 comprises a forward part 3 which comprises a forward chassis 4, which in turn is supported on a pair of spaced apart forward ground engaging wheels 5, and a rearward part 7 which comprises a rearward chassis 6, which in turn is supported on a pair of spaced apart rearward ground engaging wheels 8. The forward chassis 4 and the rearward chassis 6 are pivotally coupled together about a pair of centrally located substantially vertically extending main pivot shafts 9, which defines a substantially vertically extending main pivot axis 10 for facilitating steering of the work vehicle 1. A pair of hydraulically powered steering rams 13 are located on respective opposite sides of the work vehicle 1 coupled between the forward chassis 4 and rearward chassis 6 of the work vehicle 1 for pivoting the forward and rearward parts 3 and 7 of the work vehicle 1 relative to each other about the main pivot axis 10 for steering thereof. The pivotal coupling of the forward and rearward parts of such work vehicles for facilitating steering of a work vehicle will be well known to those skilled in the art, and it is not intended to describe the pivotal coupling of the forward and rearward parts 3 and 7 of the work vehicle 1 in further detail. Additionally, since such work vehicles as the work vehicle 1 will be well known, the forward and rearward parts 3 and 7, as well as the forward and rearward chassises 4 and 6, and the forward and rearward ground engaging wheels 5 and 8 are illustrated in outline only by broken lines.

The forward part 3 of the work vehicle 1 comprises a driver's cab 11 which is mounted and supported on the forward chassis 4 of the forward part 3 of the work vehicle 1. The rearward part 7 of the work vehicle 1 comprises a housing 12 which is supported on the rearward chassis 6 of the rearward part 7.

An engine, which in this embodiment of the invention comprises a diesel powered internal combustion engine 14, is mounted on the rearward chassis 6 of the rearward part 7 of the work vehicle 1 and is located within the housing 12. A main output drive shaft 15, namely, an end of the crank shaft (not shown) of the engine 14 carries a flywheel 17 of the engine 14 which is located in a flywheel housing 19 on an output end 18 of the engine 14.

A mechanical step-up drive transmission means, which in this embodiment of the invention comprises a step-up gearbox 20 is located within the housing 12 in the rearward part 7 of the work vehicle 1 on the output side of the flywheel housing 19, with the flywheel 17 located between the step-up gearbox 20 and the engine 14. The step-up gearbox 20 comprises an input shaft 21 which is driven directly from the main output drive shaft 15 of the engine 14 through a coupling (not shown), which may be a rigid coupling or a flexible coupling. First, second and third output drives provided by first, second and third output shafts 23, 24 and 25, respectively, extend from the step-up gearbox 20. The first output shaft 23 provides a first drive and is directly coupled to a first hydraulic pump 27 for powering the first hydraulic pump 27. The second output shaft 24 provides a second drive and is coupled directly to a second hydraulic pump 28 for powering the second hydraulic pump 28.

The first hydraulic pump 27 is located within the housing 12 in the rearward part 7 of the work vehicle 1 and produces an hydraulic power supply for an hydraulic drive system, which is described below, for providing motive power for driving the front and rearward ground engaging wheels 5 and 8. The second hydraulic pump 28 is located within the housing 12 in the rearward part 7 of the work vehicle 1 and produces an hydraulic power supply for providing hydraulic power for powering attachments and tools which are attached to the work vehicle 1 as well as for other functions of the work vehicle, for example, for powering the steering rams 13 for steering the work vehicle 1.

A mechanical step-down drive transmission means, which in this embodiment of the invention comprises a step-down gearbox 30 is located within the housing 12 in the rearward part 7 of the work vehicle 1, and provides drive for driving a power take-off shaft 29. The power take-off shaft 29 is located in the forward part 3 of the work vehicle 1 and terminates adjacent the front end 31 of the forward part 3 of the work vehicle 1. The power take-off shaft 29 is rotatably carried in a pair of spaced apart main bearings 26 located adjacent respective opposite ends of the power take-off shaft 29, and mounted in the forward chassis 4 of the forward part 3.

The step-down gearbox 30 comprises an input shaft 32 which is driven directly from the main output shaft 15 of the engine 14 through the third output shaft 25 of the step-up gearbox 20. The input shaft 32 is securely connected to the third output shaft 25 of the step-up gearbox 20 by a flexible coupling 34. An output shaft 33 from the step-down gearbox 30 provides the drive for the power take-off shaft 29.

A main mechanical drive transmission means comprising a main drive transmission shaft 35 transmits drive from the output shaft 33 of the step-down gearbox 30 to the power take-off shaft 29. The main drive transmission shaft 35 extends between a first end 36 and a second end 37. A first universal coupling 38 coupled to the first end 36 of the main drive transmission shaft 35 couples the main drive transmission shaft 35 to the output shaft 33 of the step-down gearbox 30. A second universal coupling 39 coupled to the second end 37 of the main drive transmission shaft 35 couples the main drive transmission shaft 35 to the power take-off shaft 29 for driving the power take-off shaft 29. In this embodiment of the invention the length of the main drive transmission shaft 35 is variable as will be described in detail below for accommodating steering of the work vehicle 1. The main drive transmission shaft 35 is shielded by a safety protection shield 70 which is also described below.

Returning now to the step-up gearbox 20, the step-up gearbox 20 comprises a housing 40 which is secured to the flywheel housing 19, and in which the input shaft 21 and the first, second and third output shafts 23, 24 and 25 are rotatably mounted in bearings (not shown). An externally toothed main gearwheel 41 located in the housing 40 of the step-up gearbox 20 is mounted fast on the input shaft 21 thereof, and provides a common gear of respective first and second step-up meshing gears 42 and 43, respectively. The other gear of the first step-up meshing gears 42 comprises an externally toothed first gearwheel 44 located in the housing 40 and mounted fast on the first output shaft 23 and meshes with the main gearwheel 41. The other gear of the second step-up meshing gears 43 comprises an externally toothed second gearwheel 45 located in the housing 40 and mounted fast on the second output shaft 24 and meshes with the main gearwheel 41. The first and second gearwheels 44 and 45 and the main gearwheel 41 are configured to produce respective drives on the first and second output shafts 23 and 24 of respective first and second step-up gear ratios, which in this embodiment of the invention are different to each other.

The first step-up gear ratio which the main gearwheel 41 and the first gearwheel 44 are configured to produce from the input shaft 21 to the first output shaft 23, in this embodiment of the invention, is 0.43:1. The main gearwheel 41 and the second gearwheel 45 are configured to produce the second step-up gear ratio from the input shaft 21 to the second output shaft 24 of 0.91:1. In this embodiment of the invention the third output shaft 25 and the input shaft 21 of the step-up gearbox 20 are formed as one integral shaft to provide a 1:1 gear ratio drive from the input shaft 21 to the third output shaft 25.

The step-down gearbox 30 comprises a housing 47 which is coupled to the housing 40 of the step-up gearbox 20 by a mounting bracket 48. The input shaft 32 and the output shaft 33 of the step-down gearbox 30 are rotatably mounted in the housing 47 in bearings (not shown). A step-down gear train 49 is located in the housing 47 for stepping down the rotational speed on the input shaft 32 to the output shaft 33. The step-down gear train 49 is illustrated in FIGS. 3 and 5, and comprises a first gear 50 fast on the input shaft 32, and a second gear 51 which is rotatably mounted on the output shaft 33 and is selectively coupleable to the output shaft 33 by a clutch 52, as will be described below. The first and second gears 50 and 51 mesh with each other. However, it will be appreciated by those skilled in the art that the step-down gear train 49 may include more than two gears, in which case, the additional gears of the gear train would be located intermediate first and second gears 50 and 51. The third output shaft 25 from the step-up gearbox 20 is directly coupled to the input shaft 32 of the step-down gearbox 30 through the flexible coupling 34, so that power is transmitted directly from the main output drive shaft 15 of the engine 14 to the input shaft 32 of the step-down gearbox 30.

In this embodiment of the invention the step-down gear ratio of the gear train 49 of the step-down gearbox 30 from the input shaft 32 to the output shaft 33 is 2:1, which in this embodiment of the invention is suitable to produce drive on the output shaft 33 of the step-down gearbox 30 such that the rotational speed of the output shaft 33 is similar to the regulatory rotational speed allowed for a power take-off shaft when the engine 14 is rotating at its normal operating speed. In this embodiment of the invention the normal operating speed of the main output drive shaft 15 of the engine 14 is 2,000 rpm approximately, and thus at this speed the rotational speed of the output shaft 33 of the step-down gearbox 30, and in turn of the power take-off shaft 29 is approximately 1,000 rpm, which in the jurisdiction for which the work vehicle 1 is being manufactured is the regulatory rotational speed allowed for a forward power take-off shaft. However, by altering the gear ratio of the step-down gearbox 30 between the input shaft 32 and the output shaft 33, or by altering the normal operating speed of the engine 14, it will be readily understood by those skilled in the art, that the normal operating speed of the power take-off shaft 29 could be altered in order to comply with regulations in various or other jurisdictions. For example, either the gear ration of the step-down gearbox 30 or the normal operating speed of the engine could be altered to produce a rotational speed on the output shaft 33 of the step-down gearbox 30 of 540 rpm, 750 rpm, in order to operate the power take-off shaft 29 at the rotational speed of either 540 rpm or 750 rpm.

Turning now to the clutch 52, the clutch 52 forms an isolating means for selectively isolating the output shaft 33 of the step-down gearbox 30 from drive on the main output drive shaft 15 of the engine 14, for in turn isolating the power take-off shaft 29 from the main output drive shaft 15. In this embodiment of the invention the clutch 52 comprises an integrated clutch, which is integrated in the step-down gearbox 30 within the housing 47 of the step-down gearbox 30. The clutch 52 is coupled between the second gear 51 and the output shaft 33 of the step-down gearbox 30, and is mounted fast on the output shaft 33 and is selectively coupleable to the second gear 51 for selectively coupling and decoupling the output shaft 33 to and from the second gear 51 for in turn selectively applying drive to the main drive transmission shaft 35 and in turn to the power take-off shaft 29 from the main output drive shaft 15 of the engine 14. A clutch lever 55 which is operated by a solenoid 56 operates the clutch 52 for selectively coupling and decoupling the output shaft 33 to and from the second gear 51, for in turn selectively applying drive to the main drive transmission shaft 35 and in turn to the power take-off shaft 29.

Referring now to FIG. 8, the hydraulic drive system for driving the forward and rearward ground engaging wheels 5 and 8, in this embodiment of the invention comprises an hydrostatic drive system which is illustrated in block representation in FIG. 8, and is identified by the reference number 57. The hydrostatic drive system 57 comprises four hydraulic motors, namely two forward hydraulic motors 58 which are drivingly coupled to the forward ground engaging wheels 5 for driving the forward ground engaging wheels 5, and two rearward hydraulic motors 59 which are drivingly coupled to the respective rearward ground engaging wheels 8 for driving the rearward ground engaging wheels 8. An hydrostatic control circuit 60 controls the operation of the hydrostatic drive system 57 for independently controlling delivery of hydraulic fluid from the first hydraulic pump 27 to the respective forward and rearward hydraulic motors 58 and 59. A control panel 61 comprising suitable control levers and buttons for controlling the hydrostatic drive system through the hydrostatic control circuit 60 is located in the drivers cab 11. The powering and controlling of forward and rearward hydraulic motors for driving the forward and rearward ground engaging wheels of such a work vehicle through a hydrostatic drive system will be known to those skilled in the art.

A panel 62 on which a plurality of hydraulic couplers 63 are located is provided adjacent the forward end 31 of the forward part 3 of the work vehicle 1 for providing hydraulic power supplies for powering the attachments and/or tools attached to the work vehicle 1. The powering of such attachments and tools to be attached to a work vehicle will be well known to those skilled in the art. The hydraulic power supply to the hydraulic couplers 63 from the second hydraulic pump 28 is controlled from the driver's cab 11.

Turning now to the main drive transmission shaft 35, and referring in particular to FIG. 9, as discussed above in this embodiment of the invention the main drive transmission shaft 35 is of variable length to accommodate steering of the work vehicle 1 about the main substantially vertically extending pivot axis 10. The main drive transmission shaft 35 comprises a pair of telescoping shafts, namely, an inner telescoping shaft 65 and an outer telescoping shaft 66. The inner telescoping shaft 65 is provided with longitudinally extending splines 67 which engage corresponding internal longitudinally extending splines 68 in the outer telescoping shaft 66 to permit longitudinal sliding of the inner and outer telescoping shafts 65 and 66 relative to each other. The inner telescoping shaft 65 is coupled to the first universal coupling 38, while the outer telescoping shaft 66 is coupled to the second universal coupling 39.

The safety protective shield 70 which shields the main drive transmission shaft 35 comprises a pair of telescoping sleeves, namely, an inner telescoping sleeve 71 and an outer telescoping sleeve 72, within which the inner telescoping sleeve 71 is slideable inwardly and outwardly for accommodating the main drive transmission shaft 35 as the length of the main drive transmission shaft 35 varies during steering of the work vehicle 1. The inner telescoping sleeve 71 terminates in a first shielding housing 74 for accommodating the first universal coupling 38 therein. The outer telescoping sleeve 72 terminates in a second shielding housing 75 for shielding the second universal coupling 39. The inner diameter of the inner telescoping sleeve 71 and the inner diameter of the outer telescoping sleeve 72, as well as the internal dimensions of the first and second housings 74 and 75 freely accommodate the main drive transmission shaft 35 and the first and the second universal couplings 38 and 39 therein, so that the main drive transmission shaft 35 and the first and second universal couplings 38 and 39 can freely rotate within the safety shield 70. Chains 76 and 77 extending from the first and second shielding housings 74 and 75, respectively, are provided for coupling to the rearward chassis 6 and the forward chassis 4, respectively, for preventing rotation of the shield 70 with the main drive transmission shaft 35.

The main drive transmission shaft 35 is relatively short, and in this embodiment of the invention is of length L between the centre of the first universal coupling 38 and the centre of the second universal coupling 39 of approximately 350 mm when the forward and rearward parts 3 and 7 are aligned in the forward/rearward direction, and of length of approximately 300 mm when the forward part 3 has pivoted relative to the rearward part 7 to the right or the left in a maximum one of the steering locks. Additionally, the main drive transmission shaft 35 is configured so that the mid point 78 of the main drive transmission shaft 35 between the first and second ends 36 and 37 thereof substantially coincide with the main substantially vertically extending pivot axis 10 when the forward and rearward parts 3 and 7 of the work vehicle 1 are aligned in the forward/rearward direction. It has been found that by maintaining the main drive transmission shaft 35 as short as possible and locating it and configuring it so that the mid point 78 thereof coincides with the main substantially vertically extending pivot axis 10 when the forward and rearward parts 3 and 7 of the work vehicle 1 are aligned, minimises the side to side movement of the main drive transmission shaft 35 relative to the forward and rearward parts 3 and 7 of the work vehicle 1 as the forward and rearward parts 3 and 7 of the work vehicle 1 pivot about the main substantially vertically extending pivot axis 10 during steering of the work vehicle 1. This, it has been found, substantially minimises exposure of the main drive transmission shaft 35 during steering of the work vehicle 1.

In use, a driver seated in the driver's cab 11 drives and steers the work vehicle 1 by operating the relevant controls in the driver's cab 11, and also controls the hydraulic power supply to the hydraulic couplers 63 for in turn powering and operating the attachments and/or tools attached to the work vehicle 1.

Referring now to FIG. 10, there is illustrated a work vehicle according to another embodiment of the invention, which is indicated generally by the reference numeral 80. The work vehicle 80 is substantially similar to the work vehicle 1 described with reference to FIGS. 1 to 9, and similar components are identified by the same reference numerals. The main difference between the work vehicle 80 and the work vehicle 1 is in the transmission of drive from the output shaft 33 of the step-down gearbox 30 to the power take-off shaft 29. In this embodiment of the invention the main drive transmission shaft 35 transmits drive to the power take-off shaft 29 through an intermediate drive transmission shaft 83. The intermediate drive transmission shaft 83 is coupled to the main drive transmission shaft 35 by the second universal coupling 39, while the intermediate drive transmission shaft 83 is coupled to the power take-off shaft 29 by a third universal coupling 84. The main drive transmission shaft 35 is coupled to the output shaft 33 of the step-down gearbox 30 through the first universal coupling 38, as already described with reference to the work vehicle 1.

The intermediate drive transmission shaft 83 is rotatably carried in intermediate shaft carrying bearings 85 and 86 located adjacent respective opposite ends of the intermediate drive transmission shaft 83. The intermediate shaft carrying bearings 85 and 86 are mounted in the forward chassis 4 for locating the intermediate drive transmission shaft 83 in a fixed location in the forward part 3 of the work vehicle 80.

As is the case of the main drive transmission shaft 35 of the work vehicle 1, the main drive transmission shaft 35 of the work vehicle 80 is relatively short and is of similar length to the main drive transmission shaft 35 of the work vehicle 1, and bridges the main substantially vertically extending pivot axis 10 about which the forward and rearward parts 3 and 7 of the work vehicle 80 pivot relative to each other during steering thereof. In this embodiment of the invention the main substantially vertically extending pivot axis 10 of the work vehicle 80 substantially coincides with the mid point 78 of the main drive transmission shaft 35 when the forward part 3 and the rearward part 7 of the work vehicle 80 are aligned. In this way the relative sideward movement of the main drive transmission shaft 35 relative to the forward part 3 and the rearward part 7 of the work vehicle 80 is minimised during pivoting of the forward and rearward parts 3 and 7 of the work vehicle 80 about the main substantially vertically extending pivot axis 10 during steering thereof.

Although not illustrated in FIG. 10, the main drive transmission shaft 35 of the work vehicle 80 is of variable length and comprises inner and outer telescoping shafts similar to the inner and outer telescoping shafts 65 and 66 of the main drive transmission shaft 35 of the work vehicle 1. The main drive transmission shaft 35 of the work vehicle 80 is shielded by a safety shield, similar to that already described with reference to the work vehicle 1 of FIGS. 1 to 9 thereof.

Otherwise, the work vehicle 80 is similar to the work vehicle 1, and its use and operation is likewise similar.

The advantages of the invention are many. A particularly important advantage of the invention is that the work vehicles 1 and 80 according to the invention are relatively safe work vehicles. The safety aspects of the work vehicles are achieved firstly, by virtue of the fact that the only mechanical drive which is transmitted from the engine 14 which is located in the rearward part 7 of the work vehicles 1 and 80 to the forward part 3 of the work vehicles is a mechanical drive for powering the power take-off shaft 29 of the work vehicles which is located in the forward parts 3 thereof. However, by virtue of the fact that the mechanical drive to the power take-off shaft 29 in the forward part of the work vehicle is transmitted at the speed at which the power take-off shaft is to be driven in order to conform with maximum speed regulations for power take-off shafts, the speed at which the mechanical drive is transmitted from the rearward part 7 to the forward part 3 of the work vehicles is a relatively low speed, thus minimising the risk of an accident. Additionally, by virtue of the fact that no other mechanical drive transmission is transmitted from the rearward part to the forward part of the work vehicle, again the risk of accidents is minimised. By virtue of the fact that the only mechanical drive transmitted from the rearward part to the forward part of the work vehicle is through the main drive transmission shaft 35, which is the only mechanical drive transmitted from the rearward part to the forward part of the work vehicle, the risk of accidents is further reduced if not totally eliminated.

By locating the main drive transmission shaft in a safety shield the safety of the work vehicle is further enhanced. Additionally, by maintaining the main drive transmission shaft 35 relatively short, and ideally, by configuring the main drive transmission shaft 35 between the rearward and forward parts of the work vehicles so that the mid point 75 of the main drive transmission shaft 35 between the respective first and second ends thereof substantially coincides with the main substantially vertically extending pivot axis about which the rearward and forward parts of the work vehicles are pivoted for facilitating steering thereof, the side to side movement of the main drive transmission shaft 35 relative to forward and rearward parts 3 and 7 of the work vehicles during steering of the work vehicle is minimised thus further increasing the safety of the work vehicle according to invention.

A further advantage of the invention is achieved by virtue of the fact that the first and second hydraulic pumps 27 and 28 for providing motive power to the work vehicles are located in the rearward part of the work vehicle, thus, avoiding the need for any further mechanical drive transmissions from the rearward part and the forward part of the work vehicles. The hydraulic power from the rearward part of the work vehicle to the forward part thereof is transmitted through hydraulic pipes. This further enhances the safety of the work vehicle.

A further advantage of the invention is achieved by virtue of the fact that it is only mechanical drive to the power take-off shaft which is transmitted from the rearward part to the forward part of the work vehicles. Since in many cases the power take-off shaft may not be required, and may only be required when specific implements are mounted on the forward part of the work vehicles, the mechanical drive from the rearward part of the work vehicles to the power take-off shaft can be isolated by the clutch 52 or other suitable isolating means thereby the main drive transmission shaft 35 can be isolated from the engine, thus further adding to the safety of the work vehicle.

An additional advantage of the invention is that it provides a relatively comfortable driver's cab for the driver whereby the driver's cab is relatively free from vibration, which would otherwise be caused by mechanical drive in the forward part of the work vehicles. By virtue of the fact that the high speed drives which are required for powering the hydraulic pumps are confined to the rearward part of the work vehicles, the forward part of the work vehicles is immune to any vibrations which would otherwise be caused by such high speed drives. The drive which is transmitted into the forward part of the work vehicles by the main drive transmission shaft 35 is as discussed above at a relatively low speed and thus vibrations resulting from such a mechanical drive are minimised and their transmission to the driver's cab is likewise minimised. Indeed, when the power take-off shaft is not required, the main drive transmission shaft 35 can be isolated from the drive from the step-down gearbox, thus eliminating mechanical vibrations from the forward part of the work vehicles, which would otherwise be caused by the drive transmission to the power take-off shaft.

It will be readily apparent to those skilled in the art that instead of driving the first and second pumps from separate drives from the step-up gearbox, the first and second pumps could be driven in series and mounted on the same output shaft from the step-up gearbox. It will also be appreciated that in certain cases a single hydraulic pump for providing both the motive power, power for steering the work vehicles, and power for the attachments may be sufficient, and in other cases, it is envisaged that more than two hydraulic pumps may be provided.

While in the work vehicle 80 described with reference to FIG. 10, the main drive transmission means has been described as comprising the main drive transmission shaft 35 and an intermediate drive transmission shaft 83, in certain cases, it is envisaged that two or more intermediate drive transmission shafts may be provided between the main drive transmission shaft and the power take-off shaft. In which case, the intermediate drive transmission shafts would be located in a series between the main drive transmission shaft and the power take-off shaft, whereby drive would be transmitted from the main drive transmission shaft sequentially through the respective intermediate drive transmission shafts to the power take-off shaft.

While the mechanical step-down drive transmission means has been described as comprising a step-down gearbox, any other suitable mechanical step-down drive transmission means may be provided. Indeed, it is envisaged that in certain cases, the mechanical step-down drive transmission means may comprise a step-down belt drive transmission, a step-down chain drive transmission, or any other suitable mechanical step-down drive transmission. It is also envisaged that the mechanical step-down drive transmission means may be a variable step-down drive transmission means, and in which case the step-down gear ratio could be selectable.

It will also be appreciated that while the mechanical step-up drive transmission means has been described as comprising a step-up gearbox, any other suitable mechanical step-up drive transmission means may be provided, for example, a step-up belt drive transmission, a step-up chain drive transmission, or indeed, any other suitable mechanical step-up drive transmission. It is also envisaged that the mechanical step-up drive transmission may be a variable drive transmission, and in which case the first and second step-up gear ratios would be selectable.

While the mechanical step-up drive transmission means has been described as comprising first and second output shafts, in certain cases, it is envisaged that the mechanical step-up drive transmission means may comprise only one single output shaft, and indeed, in certain cases the mechanical step-up drive transmission means may comprise more than two output shafts.

While the mechanical step-down drive transmission means has been described as being driven through a shaft extending through the mechanical step-up drive transmission means, this is not essential, and the mechanical step-down drive transmission means may be coupled to the main output drive shaft of the engine directly.

It is also envisaged that in certain cases the mechanical step-up drive transmission means and the mechanical step-down drive transmission means may be incorporated in a single housing, and may indeed be provided by a single gearbox having respective output drive shafts.

While it is desirable, it is not essential that the mechanical step-up drive transmission means and the mechanical step-down drive transmission means be coupled directly to the main output drive shaft of the engine, the mechanical step-up drive transmission means and the mechanical step-down drive transmission means may be indirectly coupled to the main output drive shaft of the engine.

While the mechanical step-up drive transmission means has been described as providing drive on the first and second output shafts at respective specific gear ratios from the input shaft, it will be readily apparent to those skilled in the art that the gear ratio between the input shaft and the first and second output shafts of the mechanical step-up drive transmission means may be of any other desired values.

While the gear ratio between the input shaft and the output shaft of the mechanical step-down drive transmission means has been described as being of a specific gear ratio, it will be readily apparent to those skilled in the art that the gear ratio between the input shaft and the output shaft of the mechanical step-down drive transmission means may be of any other desired or suitable value.

While the safety shield for shielding the main drive transmission shaft 35 of the work vehicles has been described as comprising a pair of telescoping sleeves, it will be readily apparent to those skilled in the art that any other suitable safety shield may be provided for shielding the main drive transmission shaft 35.

While the main drive transmission shaft has been described as being of a specific length between the centre of the first universal coupling and the centre of the second universal coupling, it will be appreciated that the main drive transmission shaft may be of other suitable lengths, and in general, it is envisaged that the main drive transmission shaft may be of length between the centres of the first and second universal couplings of up to 600 mm when forward and rearward parts of the work vehicle are aligned in the forward/rearward direction, but would preferably, be of length up to 500 mm, and ideally up to 400 mm when the forward and rearward parts of the work vehicle are aligned in the forward/rearward direction. Although it will be understood that the length of the main drive transmission shaft will be dictated by the size of the work vehicle.

The invention claimed is:

1. A work vehicle comprising a forward part supported on a pair of forward ground engaging wheels, and a rearward part supported on a pair of rearward ground engaging wheels, at least one of the pairs of forward ground engaging wheels and rearward ground engaging wheels being rotatably driven by at least one hydraulic drive motor, the rearward part of the work vehicle being pivotally coupled to the forward part thereof about a substantially vertically extending main pivot axis for facilitating steering of the work vehicle, an engine located in the rearward part of the work vehicle, the engine comprising a main output drive shaft, a first hydraulic pump located in the rearward part of the work vehicle powered by drive derived from the main output drive shaft of the engine, the first hydraulic pump being configured to produce a hydraulic power supply for powering the at least one hydraulic drive motor, a power take-off shaft rotatably mounted in the forward part of the work vehicle, a mechanical step-down drive transmission means located in the rearward part of the work vehicle, the mechanical step-down drive transmission means having an input shaft driven by drive derived from the main output drive shaft of the engine and an output shaft for producing drive for transmission to the power take-off shaft, the mechanical step-down drive transmission means having a step-down gear ratio to produce drive on the output shaft thereof of rotational speed less than the rotational speed of the main output drive shaft of the engine, and a main mechanical drive transmission means transmitting drive from the output shaft of the mechanical step-down drive transmission means to the power take-off shaft located in the forward part of the work vehicle.

2. A work vehicle as claimed in claim 1 in which the step-down gear ratio of the mechanical step-down drive transmission means is configured to produce drive on the output shaft thereof of rotational speed not exceeding a regulatory rotational speed for a power take-off shaft when the engine is running at its normal operating speed.

3. A work vehicle as claimed in claim 1 in which an isolating means is provided for selectively isolating drive on the main output drive shaft of the engine from the output shaft of the mechanical step-down drive transmission mean.

4. A work vehicle as claimed in claim 3 in which the isolating means comprises a clutch, the clutch being located at one of a location between the main output drive shaft of the engine and the mechanical step-down drive transmission means, a location between the mechanical step-down drive transmission means and the main mechanical drive transmission means, and a location in the mechanical step-down drive transmission means.

5. A work vehicle as claimed in claim 1 in which the input shaft of the mechanical step-down drive transmission means is driven directly from the main output drive shaft of the engine.

6. A work vehicle as claimed in claim 1 in which the mechanical step-down drive transmission means comprises at least two meshing step-down gears to produce the step-down gear ratio between the input shaft of the mechanical step-down drive transmission means and the output shaft thereof.

7. A work vehicle as claimed in claim 1 in which the main mechanical drive transmission means comprises a main drive transmission shaft extending between a first end and a second end, the first end thereof terminating in a first universal coupling coupled to the output shaft of the mechanical step-down drive transmission means, the second end of the main drive transmission shaft terminating in a second universal coupling, through which drive is transmitted to the power take-off shaft.

8. A work vehicle as claimed in claim 7 in which the main drive transmission shaft is coupled to the power take-off shaft by the second universal coupling.

9. A work vehicle as claimed in claim 7 in which the main mechanical drive transmission means further comprises an intermediate drive transmission shaft configured to transmit drive from the main drive transmission shaft to the power take-off shaft, the main drive transmission shaft being coupled to the intermediate drive transmission shaft by the second universal coupling.

10. A work vehicle as claimed in claim 9 in which the intermediate drive transmission shaft is rotatably carried in at least one intermediate shaft carrying bearing anchored in the forward part of the work vehicle.

11. A work vehicle as claimed in claim 7 in which the substantially vertically extending main pivot axis passes through the main drive transmission shaft when the forward and rearward parts of the work vehicle are aligned in a forward/rearward direction.

12. A work vehicle as claimed in claim 1 in which a mechanical step-up drive transmission means is located in the rearward part of the work vehicle, the mechanical step-up drive transmission means comprising an input shaft driven by drive derived from the main output drive shaft of the engine, and at least a first output drive, the first output drive being configured to produce drive for powering the first hydraulic pump.

13. A work vehicle as claimed in claim 12 in which the mechanical step-up drive transmission means is configured to have a first step-up gear ratio between the input shaft and the first output drive, the first step-up gear ratio being configured so that the rotational speed of the drive on the first output drive is greater than the rotational speed of the main output drive shaft of the engine.

14. A work vehicle as claimed in claim 13 in which the mechanical step-up drive transmission means is configured to have a second step-up gear ratio between the input shaft and the second output drive, the second step-up gear ratio being configured so that the rotational speed of drive on the second output drive is greater than the rotational speed of the main output drive shaft of the engine.

15. A work vehicle as claimed in claim 14 in which the mechanical step-up drive transmission means comprises at least two first step-up meshing gears to produce the first step-up gear ratio between the input shaft of the mechanical step-up drive transmission means and the first output drive therefrom, and the mechanical step-up drive transmission means comprises at least two second step-up meshing gears to produce the second step-up gear ratio between the input shaft of the mechanical step-up drive transmission means and the second output drive therefrom.

16. A work vehicle as claimed in claim 12 in which the input shaft of the mechanical step-up drive transmission means is driven directly from the main output drive shaft of the engine.

17. A work vehicle as claimed in claim 15 in which one of the gears of each of the first and second step-up meshing gears of the mechanical step-up drive transmission means comprises a common gear mounted on the input shaft of the mechanical step-up drive transmission means.

18. A work vehicle as claimed in claim 12 in which the mechanical step-up drive transmission means comprises a second output drive, and a second hydraulic pump is provided for producing a hydraulic power supply for powering one or more hydraulically powered attachments coupled to or associated with the work vehicle, the second hydraulic pump being located in the rearward part of the work vehicle, and being configured to be powered by drive from one of the first and second output drives from the mechanical step-up drive transmission means.

19. A work vehicle as claimed in claim 18 in which the first hydraulic pump is driven directly from the first output drive of the mechanical step-up drive transmission means, and the second hydraulic pump is driven directly from the second output drive of the mechanical step-up drive transmission means.

20. A work vehicle as claimed in claim 1 in which each of the ground engaging wheels of the forward and rearward parts of the work vehicle is powered by a corresponding hydraulic drive motor.

21. A work vehicle as claimed in claim 1 in which the step-down gear ratio of the mechanical step-down drive transmission means is configured to produce drive on the output shaft thereof of rotational speed in the range of 500 rpm to 1500 rpm when the engine is running at its normal operating speed.

22. A method for driving a power take-off shaft of a work vehicle wherein the work vehicle comprises a forward part supported on a pair of forward ground engaging wheels, and a rearward part supported on a pair of rearward ground engaging wheels, at least one of the pairs of forward ground engaging wheels and rearward ground engaging wheels being rotatably driven by at least one hydraulic drive motor, the rearward part of the work vehicle being pivotally coupled to the forward part thereof about a substantially vertically extending main pivot axis for facilitating steering of the work vehicle, an engine located in the rearward part of the work vehicle, the engine comprising a main output drive shaft, a first hydraulic pump located in the rearward part of the work vehicle powered by drive derived from the main output drive shaft of the engine, the first hydraulic pump being configured to produce a hydraulic power supply for powering the at least one drive motor, the power take-off shaft being rotatably mounted in the forward part of the work vehicle, the method comprising locating a mechanical step-down drive transmission means in the rearward part of the work vehicle, the mechanical step-down drive transmission means having an input shaft and an output shaft, driving the input shaft of the mechanical step-down drive transmission means by drive derived from the main output drive shaft of the engine, configuring the mechanical step-down drive transmission means to have a step-down gear ratio to produce drive on the output shaft thereof of rotational speed less than the rotational speed of the main output drive shaft of the engine, and transmitting drive from the output shaft of the mechanical step-down drive transmission means to the power take-off shaft located in the forward part of the work vehicle through a main mechanical drive transmission means.

* * * * *